United States Patent
Nilsson et al.

(10) Patent No.: US 10,336,185 B2
(45) Date of Patent: Jul. 2, 2019

(54) FINAL DRIVE FOR A ROAD VEHICLE

(71) Applicant: BORGWARNER TORQTRANSFER SYSTEMS AB, Landskrona (SE)

(72) Inventors: Henrik Nilsson, Eslöv (SE); Gustaf Lagunoff, Umeå (SE)

(73) Assignee: BorgWarner Sweden AB, Landskrona (SE)

( * ) Notice: Subject to any disclaimer, the term of this patent is extended or adjusted under 35 U.S.C. 154(b) by 396 days.

(21) Appl. No.: 15/103,711

(22) PCT Filed: Dec. 9, 2014

(86) PCT No.: PCT/EP2014/077073
§ 371 (c)(1),
(2) Date: Jun. 10, 2016

(87) PCT Pub. No.: WO2015/086610
PCT Pub. Date: Jun. 18, 2015

(65) Prior Publication Data
US 2016/0311320 A1   Oct. 27, 2016

(30) Foreign Application Priority Data

Dec. 12, 2013 (SE) ...................................... 1351484
Dec. 19, 2013 (SE) ...................................... 1351538

(51) Int. Cl.
*B60K 17/35* (2006.01)
*F16D 25/0638* (2006.01)
*F16H 1/14* (2006.01)

(52) U.S. Cl.
CPC .......... *B60K 17/35* (2013.01); *F16D 25/0638* (2013.01); *F16H 1/145* (2013.01)

(58) Field of Classification Search
CPC ..... B60K 17/35; B60K 23/08; F16D 25/0638; F16H 1/145
USPC ....................................................... 74/665 H
See application file for complete search history.

(56) References Cited

U.S. PATENT DOCUMENTS

| | | | |
|---|---|---|---|
| 6,079,535 A | 6/2000 | Mueller et al. | |
| 2004/0159520 A1 | 8/2004 | Anwar et al. | |
| 2005/0107200 A1 | 5/2005 | Yamazaki | |
| 2017/0297429 A1* | 10/2017 | Ito | B60K 17/16 |

FOREIGN PATENT DOCUMENTS

| | | |
|---|---|---|
| DE | 3805284 A1 | 9/1988 |
| JP | 2005299735 A | 10/2005 |
| JP | 2011-144858 * | 7/2011 |

* cited by examiner

*Primary Examiner* — William C Joyce
(74) *Attorney, Agent, or Firm* — BrooksGroup

(57) ABSTRACT

A final drive for a road vehicle comprises a pinion gear on a pinion axle journaled in a housing, the pinion gear being in gear engagement with a crown gear journaled for rotation transversely to the pinion axle. The final drive is combined with an all wheel drive (AWD) coupling, comprising a disc package axially controlled by a hydraulic piston for optionally transmitting torque from an ingoing axle to the pinion axle, the disc package being rotatably connected to the pinion axle. The ingoing axle of the AWD coupling is radially journaled only by the pinion axle in the final drive.

10 Claims, 3 Drawing Sheets

FINAL DRIVE FOR A ROAD VEHICLE

This application claims the benefit of Swedish Application Nos. 1351484-9 filed Dec. 12, 2013, 1351538-2 filed Dec. 19, 2013 and PCT Application No. EP2014/077073 filed Dec. 9, 2014.

TECHNICAL FIELD

The present invention relates to a final drive for a road vehicle, comprising a pinion gear on a pinion axle journaled in a housing, the pinion being in gear engagement with a crown gear journaled for rotation transversely to the pinion axle, in combination with an all wheel drive (AWD) coupling, comprising a disc package axially controlled by a hydraulic piston for optionally transmitting torque from an ingoing axle to the pinion axle as well as a disc drum or similar means for rotatably connecting the disc package to the pinion axle.

BACKGROUND OF THE INVENTION

A final drive of the above-mentioned kind is customary on rear-wheel driven road vehicles—cars. The trend nowadays, however, is towards all wheel drive (AWD) cars. In such a car, a front wheel drive can be supplemented with an intermediate axle, an AWD coupling, and a final drive for driving also the rear wheels.

When a car is to be provided with an AWD coupling, it is presently customary that the AWD coupling and the final drive (including the differential) are supplied from different sources. The design is often such that an AWD coupling/final drive-unit is formed in that the housing of the AWD coupling is physically attached to the housing of the final drive, the disc drum or similar means being connected to the pinion axle.

The supplier of the final drive thus provides the proper journaling therefore.

As is well known in the art, the journaling of the pinion axle in the final drive is rather intricate, because a certain pre-stress has to be provided, especially if the pinion gear/crown gear set is a hypoid gear set. The pinion axle is thus normally journaled by two conical roller bearings or angular contact bearings, which are prestressed by a nut arrangement to be manually tightened to the correct prestress value.

The rotatable parts of the AWD coupling are likewise to be separately journaled in the coupling housing (although one of the bearings may be provided between the ingoing axle of the coupling and the pinion axle).

Generally speaking, the provision of the final drive and the AWD coupling as in principle two separate, "self-contained" (but connected) units means high cost, weight, space requirement, and losses.

The main object of the invention is to remove this and other disadvantages with the present design.

THE INVENTION

An improved solution for the journaling of the rotating parts of the AWD coupling when combined with the final drive is according to the invention attained in that the ingoing axle of the AWD coupling is radially journaled only by the pinion axle in the final drive.

In a practical embodiment a radial bearing arrangement, preferably consisting of two radial bearings, is arranged between a stub axle at the end of the pinion axle and a bearing sleeve at the end of the ingoing axle. Conversely, a stub axle may be provided at the end of the ingoing axle and a bearing sleeve at the end of the pinion axle.

The length of the bearing arrangement is such that the required journaling stability is obtained.

By the omission of the otherwise required, separate radial bearing for the ingoing axle, the bearing losses are greatly reduced. The rotational speed differential between the ingoing axle and the pinion axle is namely normally low. Also, the mounting together of the two units may be facilitated.

The radial bearings may be needle bearings.

In order to accommodate the normally small axial forces in the ingoing axle, locking rings can be arranged at either side of the disc package on a hub on the ingoing axle.

BRIEF DESCRIPTION OF THE DRAWINGS

The invention will be described in more detail below under reference to the accompanying drawings, in which.

DETAILED DESCRIPTION OF EMBODIMENTS

Figure 1:
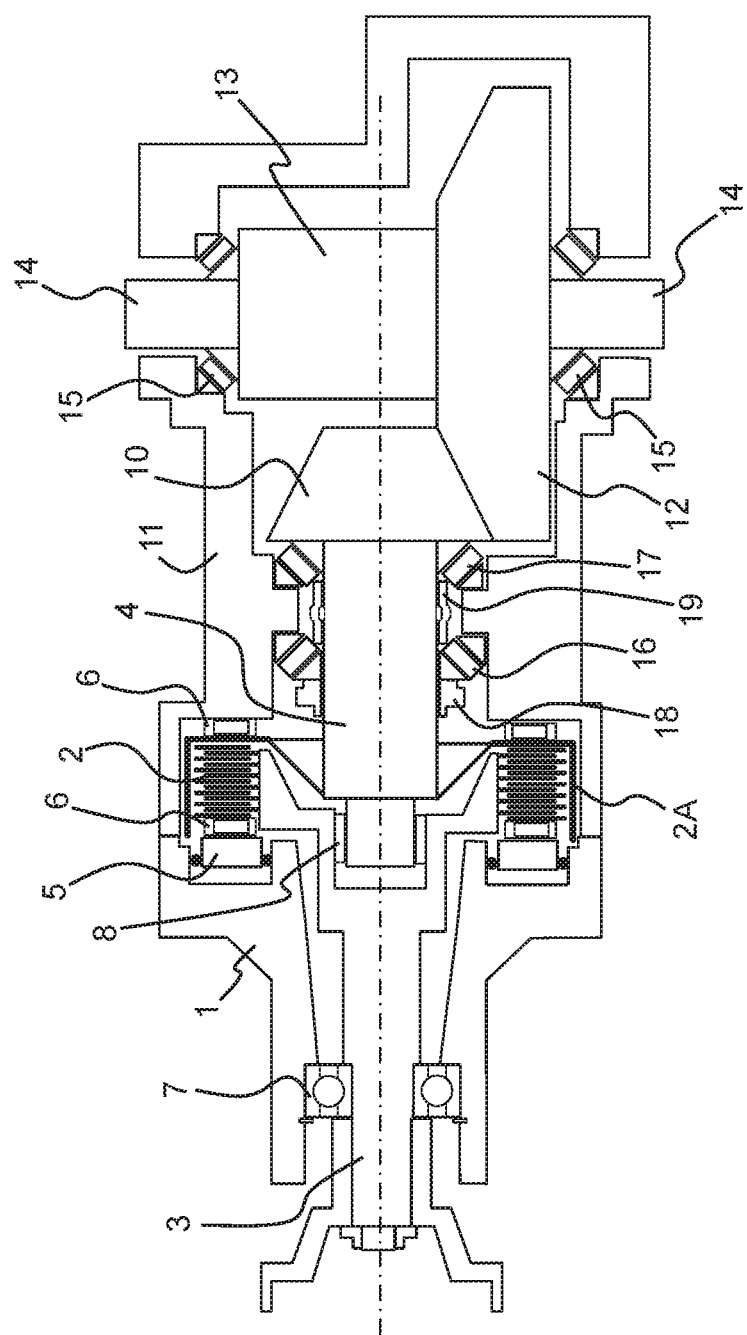
FIG. 1 is a sketch of a typical prior art arrangement of a vehicle final drive and an added AWD coupling and FIG. 2 is a similar sketch of an integrated final drive and AWD coupling according to the invention.

A typical prior art combination of a final drive and an AWD coupling in a road vehicle—a car—is shown in FIG. 1.

The description below—also of the inventive arrangement shown in FIG. 2—is focused on parts that are of importance for the proper understanding of the invention, as both the final drive and the AWD coupling are per se known and understood by persons skilled in the art.

In a coupling housing 1 a disc package 2 comprising a number of discs is arranged. These discs are alternatingly connected on one hand to a rotatably journaled ingoing axle 3 and on the other hand to a rotatably journaled outgoing axle 4 in the form of a pinion axle of the final drive (to be described). The connection to the outgoing axle 4 is performed via a disc drum 2A. The disc drum 2A is in splines engagement with the axle 4 and thus axially movable in relation thereto.

The disc package 2 is controlled by hydraulic pressure applied on a hydraulic piston 5 in the housing 1 such that the piston 5 moves towards the pinion gear 10 when controlled to actuate the disc package 2. The magnitude of the force from the hydraulic piston 5 will control the clamping force on and thus the torque transmitted by the disc package 2 from the ingoing axle 3 to the outgoing axle 4. The force from the piston 5 is transmitted to the disc package 2 and back into the housing 1 by means of axial bearings 6, preferably needle bearings.

In the shown example, the ingoing axle 3 is journaled in the housing 1 by means of only a radial bearing 7, but the pinion axle 3 extends in a supporting fashion into the opposite end, where there is a radial bearing 8, preferably a needle bearing. In other examples there may be more than one bearing for the ingoing axle 3.

A pinion gear 10 (integral with the pinion axle 4) is rotatably journaled in a final drive housing 11, which is connected to the coupling housing 1. The final drive comprises the pinion gear 10 and a crown gear 12 to form a bevel gear set, normally a hypoid gear set. A differential housing 13 is connected to the crown gear 12 and contains a conventional differential mechanism, from which two half-axles 14 extend out to driving wheels of the vehicle. The arrangement may be journaled in the final drive housing 11 by combined axial and radial bearings 15.

Shown in FIG. 1 is a conventional journaling for a pinion gear in a hypoid gear set of a final drive. This journaling comprises two bearings, a forward bearing 16 and a rearward bearing 17. These two bearings 16, 17 shall be capable of taking up the radial and axial forces from the gear engagement in the hypoid gear set. They have to have the capability of handling forces in both axial directions, because the force direction changes for example between driving the vehicle in the forward and the reverse direction. The bearings 16, 17 are normally conical roller bearings or angular contact ball bearings.

For the proper functioning of the final drive, it is of great importance to prevent play from occurring in the journaling of the pinion gear 10. The normal way to accomplish this is to apply an axial prestress on the journaling by means of a nut 18, which is threaded on the pinion axle 4 and applies an axial force on the inner ring of the forward bearing 16. For ensuring that the nut 18 does not get loose under service, there is a plate sleeve 19 between the inner rings of the two bearings 16, 17. This sleeve is first deformed elastically and then plastically during the tightening of the nut 18. The elastic force will then remain and keep the nut 18 from loosening.

The magnitude of the prestress is so chosen that the deformation due to loads and temperature expansion does not result in any play. The constant pretress over the bearings 16, 17 results in considerable energy losses.

The construction shown in FIG. 1 is just one example of how to arrange the journaling of an AWD coupling mounted together with the final drive. Another construction is to journal the AWD coupling quite independently of the final drive.

Figure 2:
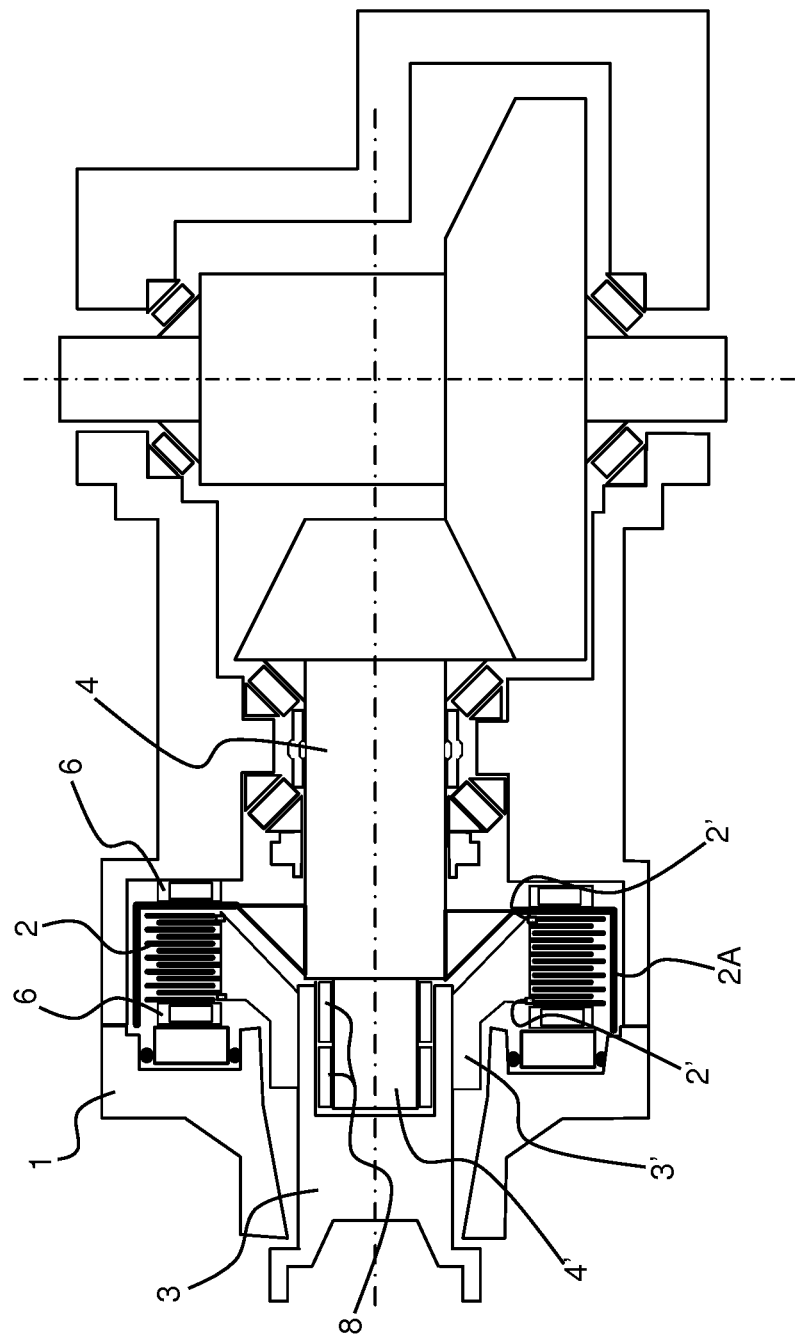
Figure 3:
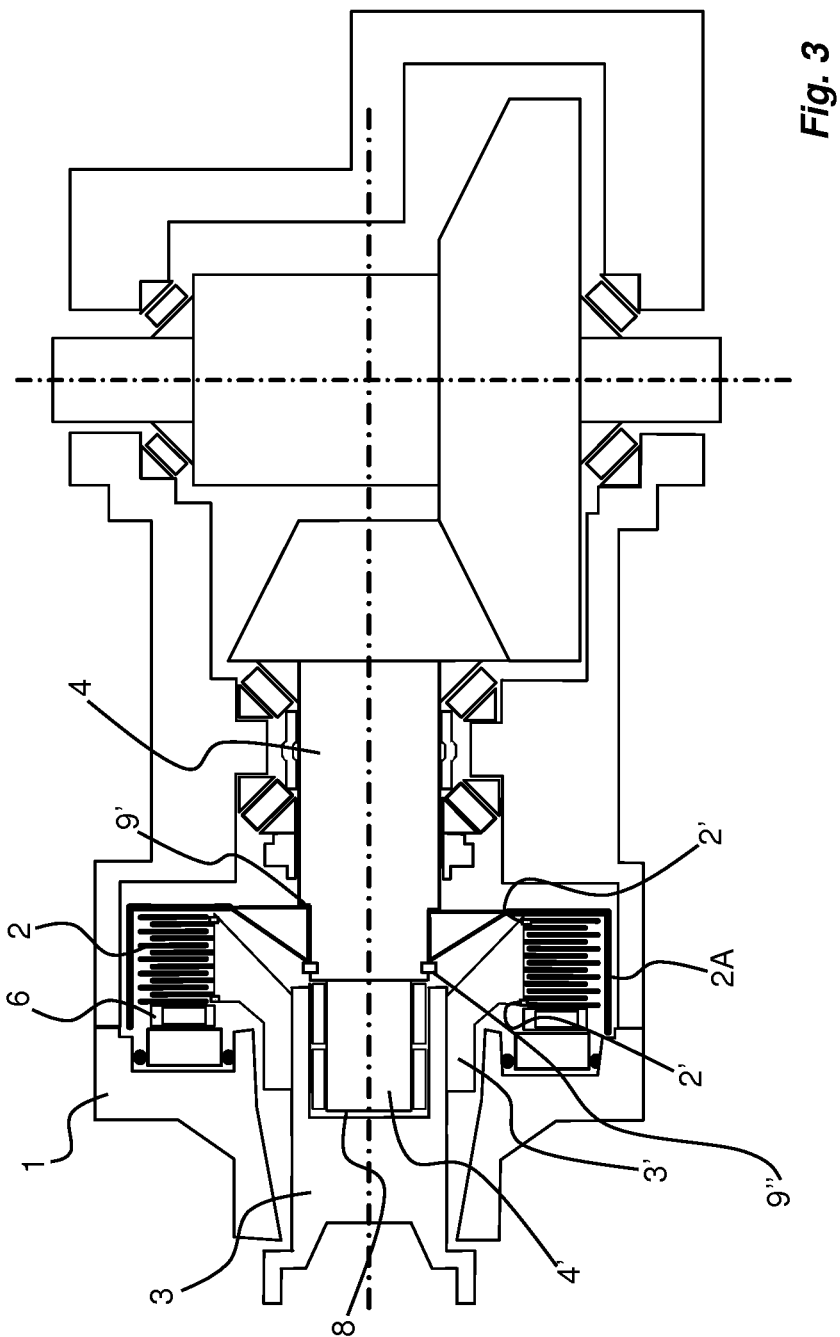
FIG. 3 is a similar sketch of an integrated final drive and AWD coupling according to another embodiment.

In the inventive solution according to FIG. 2 and FIG. 3 the integration between the AWD coupling and the final drive is more advanced.

The main construction of the different elements in the inventive solution according to FIG. 2 and FIG. 3 has so much in common with the known arrangement shown in FIG. 1 that reference is mainly made to the description above. Elements in FIG. 2 and FIG. 3 may be provided with the same numerals as in FIG. 1, even if they are not identical in the two embodiments. For the sake of clarity, FIG. 2 and FIG. 3 are only provided with reference numerals to the extent necessary for a proper understanding.

In the known embodiment according to FIG. 1 the ingoing axle 3 is journaled in the housing 1 by means of a radial bearing 7. It is also supported by the pinion axle 4 by means of a radial bearing 8.

In the inventive embodiment according to FIG. 2 and FIG. 3 the radial bearing 7 has been totally dispensed with, and the ingoing axle 3 is only journaled on the pinion axle 4. The pinion axle 4 is provided with a bearing stub axle 4' with reduced diameter, whereas the end of the ingoing axle 3 is designed as a bearing sleeve with a length at least corresponding to the length of the stub axle 4'. The length of the stub axle 4' may e.g. be 10 mm. A prolonged radial bearing arrangement, in the shown case consisting of two radial bearings 8, is placed between the stub axle 4' and the ingoing axle 3 for providing the necessary journaling with the required stability for the ingoing axle 3. The ingoing axle 3 is thus completely radially journaled on the pinion axle end.

The radial bearings 8 may be needle bearings. The radial bearing arrangement is preferably designed in order to withstand bending forces which may occur in the interface between the ingoing axle 3 and the pinion axle 4.

There are only limited axial forces in the ingoing axle 3. These forces may for example be handled by the axial needle bearings 6 at either side of the disc package 2. A locking ring 2' may for this purpose be arranged at either side of the disc package 2 on a hub 3' on the ingoing axle 3.

As the differential rotational speed between the ingoing axle 3 and the pinion axle 4 normally is inconsiderable, the bearing losses from the journaling of the ingoing axle 3 are greatly reduced.

It is within the scope of the claims to provide the journaling for the ingoing axle 3 between a stub axle on the ingoing axle and a bearing sleeve in the end of the pinion axle 4.

In FIG. 3 a further embodiment is shown, wherein the solution of having the ingoing axle 3 only journaled on the pinion axle 4 is combined with a very advantageous solution for axially guiding the outgoing axle of the coupling on the pinion axle 4.

In the arrangements according to FIG. 1 and FIG. 2 there are no interactions between the axial forces in the AWD coupling and the final drive, as there are axial bearings 6 at either side of the disc package 2 and as the disc drum 2A is in splines engagement with the pinion axle 4 without axial force transmission. The mounting together of the two units is simply performed in that the disc drum 2A is pushed into the splines engagement with the pinion axle, whereupon the two units are bolted together.

In the arrangements according to FIG. 3 on the other hand there is axial force transmission provided from the disc drum 2A to the pinion axle 4, in the direction towards the pinion gear, by means of an axial stop 9' or the like on the pinion gear axle. In order to point to design alternatives, the numeral 9' may be said to designate an axial stop e.g. in the form of lock ring means, which would include any means integral with the axle and performing the same function as a locking ring.

As in the FIG. 1 or FIG. 2 arrangements the clamping force from the piston 5 to the disc package 2 is transmitted by an axial bearing 6. This axial force is, however, now transmitted via the disc drum 2A to the pinion axle 4 and back to the housing 11 via the pinion bearings. The need for an axial bearing to the right of the disc package 2 is hereby eliminated.

An obvious advantage with this is that only one axial bearing, normally a needle bearing, is needed for the disc package 2. The result is reduced losses, costs, and weight.

Further, at normal forward driving the clamping force from the disc package 2 will act on the pinion gear in opposite direction to the forces from the gear engagement in the final drive (pinion gear 10/crown gear 12). The result is that the axial load on the pinion bearings 16, 17 will be reduced, leading to reduced losses. As the pinion bearing load added over the life span of the arrangement is reduced, smaller pinion bearings may be chosen, also leading to reduced losses, costs, and weight.

As already been described, axial forces from the disc drum 2A are transmitted to the pinion axle 4 via the axial stop 9' shown in FIG. 3. An alternative embodiment may include replacing the radial step 9' by a locking ring of the pinion axle.

The radial step 9' forms a stop surface for the disc drum 2A, and an optional lock ring 9" may be provided on the opposite side of the pinion axle 4 (i.e. opposite relative the radial step 9') for preventing the disc drum 2A to move axially away from the radial stop 9'.

In a yet further embodiment, the axial stop on the pinion axle 4 is achieved by arranging the pinion bearing pre-loading threaded nut 18 (see FIG. 1) such that the disc drum 2A is in axial contact with threaded nut 18.

In the description above and in the claims, reference has only been made to actuation of the disc package by hydraulic pressure. However, it is within the scope of the claims to actuate the disc package by any actuator, for example electrical or pneumatic.

Other modifications are possible within the scope of the appended claims.

The invention claimed is:

1. A final drive for a road vehicle, comprising a pinion gear on a pinion axle journaled in a housing, the pinion gear being in gear engagement with a crown gear journaled for rotation transversely to the pinion axle, the final drive comprising
    an all wheel drive (AWD) coupling, comprising a disc package axially controlled by a hydraulic piston for optionally transmitting torque from an ingoing axle to the pinion axle and a means for rotatably connecting the disc package to the pinion axle,
    the ingoing axle of the AWD coupling being radially journaled only by the pinion axle.

2. A final drive according to claim 1, wherein a radial bearing arrangement is arranged between a stub axle at the end of the pinion axle and a bearing sleeve at the end of the ingoing axle.

3. A final drive according to claim 2, wherein the radial bearing arrangement comprises a plurality of needle bearings.

4. A final drive according to claim 1, wherein locking rings are arranged at either side of the disc package to axially fixate a hub on the ingoing axle.

5. A final drive according to claim 1, wherein the means for rotatably connecting the disc package to the pinion axle is a disc drum.

6. A final drive according to claim 5, wherein the hydraulic piston is operating in a direction towards the pinion gear for connecting the disc package to the pinion axle, and wherein the final drive further comprises an axial stop on the pinion axle for transferring axial forces from the disc drum to the pinion axle.

7. A final drive according to claim 6, wherein an axial bearing is arranged between the hydraulic piston and the disc package.

8. A final drive according to claim 6, wherein the axial stop is a locking ring means.

9. A final drive according to claim 6, wherein the axial stop is a radial step.

10. A final drive according to claim 6, wherein the axial stop is a pinion bearing pre-loading threaded nut.

* * * * *